United States Patent
Seon et al.

(10) Patent No.: US 11,830,697 B2
(45) Date of Patent: Nov. 28, 2023

(54) SWITCH-TYPE POWER DISCONNECTION DEVICE AND BATTERY PACK INCLUDING THE SAME

(71) Applicant: LG Energy Solution, Ltd., Seoul (KR)

(72) Inventors: Sang-Ok Seon, Daejeon (KR); Sang-Eun Jung, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 17/780,056

(22) PCT Filed: Sep. 23, 2021

(86) PCT No.: PCT/KR2021/012986
§ 371 (c)(1),
(2) Date: May 26, 2022

(87) PCT Pub. No.: WO2022/102952
PCT Pub. Date: May 19, 2022

(65) Prior Publication Data
US 2022/0415589 A1    Dec. 29, 2022

(30) Foreign Application Priority Data

Nov. 10, 2020 (KR) .......................... 10-2020-0149663

(51) Int. Cl.
*H01H 9/22* (2006.01)
*H01H 9/24* (2006.01)
*H01M 50/50* (2021.01)

(52) U.S. Cl.
CPC ............... *H01H 9/22* (2013.01); *H01H 9/24* (2013.01); *H01M 50/50* (2021.01)

(58) Field of Classification Search
CPC ............ H01H 21/30; H01H 9/22; H01H 9/24; H01H 9/26; H01H 3/42; H01H 1/38;
(Continued)

(56) References Cited

U.S. PATENT DOCUMENTS 9,018,550 B2 * 4/2015 Kobayashi ........... H01H 9/0066
200/50.01
2003/0057958 A1 * 3/2003 Fukushima ......... H01R 13/62927
324/538
(Continued)

FOREIGN PATENT DOCUMENTS

CN    203659779 U    6/2014
CN    210200577 U    3/2020
(Continued)

OTHER PUBLICATIONS

International Search Report for Application No. PCT/KR2021/012986 dated Jan. 3, 2022, pp. 1-3.

*Primary Examiner* — Edwin A. Leon
(74) *Attorney, Agent, or Firm* — Lerner David LLP

(57) ABSTRACT

A power disconnection device for manually disconnecting power of a battery pack, the device including a housing, first and second interlock terminals provided in the housing and connectable to an interlock circuit of the battery pack, first and second high voltage terminals connectable to a high voltage line of the battery pack, a switch lever disposed over inner and outer portions of the housing, a first switch module in contact with the first and second interlock terminals, and upon an off operation of the switch lever, configured to be separated from any one of the first and second interlock terminals, and a second switch module configured to interlock with the first switch module, the second switch module being in contact with the first and second high voltage terminals, separated from any one of the first and second interlock terminals, and then separated from the first and second high voltage terminals.

22 Claims, 5 Drawing Sheets

(58) Field of Classification Search
CPC ...... H01H 21/42; H01H 9/0066; H01H 9/104; H01H 9/30; H01H 85/48; H01H 2009/108; H01R 13/53; H01R 13/62938
See application file for complete search history.

(56) References Cited

U.S. PATENT DOCUMENTS

| | | | |
|---|---|---|---|
| 2008/0185276 A1* | 8/2008 | Matsunaga | H01H 85/547 200/335 |
| 2009/0197456 A1 | 8/2009 | Kawai et al. | |
| 2012/0318645 A1 | 12/2012 | Kobayashi et al. | |
| 2014/0103223 A1 | 4/2014 | Tsunoda | |
| 2019/0363492 A1 | 11/2019 | Park et al. | |
| 2020/0153165 A1 | 5/2020 | Kim et al. | |

FOREIGN PATENT DOCUMENTS

| | | |
|---|---|---|
| JP | 2000243525 A | 9/2000 |
| JP | 4816246 B2 | 11/2011 |
| JP | 2013004216 A | 1/2013 |
| JP | 2013004261 A | 1/2013 |
| JP | 2013016426 A | 1/2013 |
| JP | 2015028847 A | 2/2015 |
| JP | 2017225286 A | 12/2017 |
| KR | 20090084656 A | 8/2009 |
| KR | 101699805 B1 | 1/2017 |
| KR | 101779363 B1 | 9/2017 |
| KR | 20180086769 A | 8/2018 |
| KR | 101914053 B1 | 11/2018 |
| KR | 20200056537 A | 5/2020 |

* cited by examiner

SWITCH-TYPE POWER DISCONNECTION DEVICE AND BATTERY PACK INCLUDING THE SAME

CROSS-REFERENCE TO RELATED APPLICATIONS

The present application is a national phase entry under 35 U.S.C. § 371 of International Application No. PCT/KR2021/012986 filed Sep. 23, 2021, which claims priority from Korean Patent Application No. 10-2020-0149663 filed Nov. 10, 2020, all of which are incorporated herein by reference.

TECHNICAL FIELD

The present disclosure relates to a switch-type power disconnection device, and more particularly, to a power disconnection device configured as a switch type to improve ease of use, as a device that manually disconnects the power of a battery pack so as to prevent safety accidents that may occur in the production, assembly, repair, and transportation of the battery pack, and a battery pack including the same.

BACKGROUND ART

A secondary battery refers to a battery capable of charging/discharging, unlike a primary battery incapable of charging, and is used as a power source of an electric vehicle (EV) or a hybrid electric vehicle (HEV) as well as a small high-tech electronic device such as a mobile phone, a PDA, a laptop computer, etc.

At present, it is impossible to obtain sufficient output enough to drive an EV with one secondary battery (cell). In order to apply a secondary battery as an energy source of the EV, for example, a battery module in which a plurality of lithium ion battery cells are connected in series and/or in parallel needs to be configured, and a battery pack including a battery management system (BMS) which connects the battery modules in series and functionally maintains the battery modules, a cooling system, a battery disconnection unit (BDU), an electric wiring cable, etc. is configured.

Meanwhile, a high-voltage battery pack mounted on an EV or a HEV usually includes a power disconnection device so as to prevent safety accidents that may occur in production, assembly, repair, and transportation. The power disconnection device is a device configured to allow an operator to physically disconnect the battery power of the EV, and is commonly used by various names such as manual service disconnect (MSD), safety plug, service plug, disconnect switch, etc. in the art.

As an example, a power disconnection device according to the related art includes a socket 2 fixedly mounted on one side of a battery pack and a plug 1 detachably attached to the socket 2 as shown in FIG. 1. The socket 2 includes an HV (±) terminal (not shown) connected to a high voltage line of the battery pack, and the plug 1 includes a connector (not shown) connecting the HV (±) terminal. When the plug 1 is removed from the socket 2, connection of the HV (±) terminal of the socket 2 is cut off, and thus the power of the battery pack may be disconnected.

When the plug is removed, a spark is generated at the HV (±) terminal due to a high voltage, which may cause a safety problem. In general, the power disconnection device further includes a high voltage interlock loop (HVIL) pin. In the case of a power disconnection device including the HVIL pin, when the plug is removed, an interlock loop pin on the plug side and an interlock loop pin on the socket side are first separated from each other, and then a terminal connector on the plug side and the HV (±) terminal of the socket are configured to be separable from each other. When the interlock loop pins are separated from each other, flow of a large current of the battery pack is blocked, and thus no spark is generated when the terminal connector on the plug side and the HV (±) terminal of the socket are separated from each other.

However, such a power disconnection device of the related art has disadvantages in that there is inconvenience of having to detach and attach the plug and socket every time, and the manufacturing cost is also high because the plug and socket are separately manufactured and then assembled.

SUMMARY

Technical Problem

The present disclosure is designed to solve the problems of the related art, and therefore the present disclosure is directed to providing a power disconnection device that improves ease of use by changing a power disconnection method to a switch method, and a battery pack including the same.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a power disconnection device for manually disconnecting power of a battery pack, the power disconnection device including a housing; a first interlock terminal and a second interlock terminal provided in the housing and connectable to an interlock circuit of the battery pack, and a first high voltage terminal and a second high voltage terminal connectable to a high voltage line of the battery pack; a switch lever disposed over inner and outer portions of the housing; a first switch in contact with the first interlock terminal and the second interlock terminal, and configured to, upon an off operation of the switch lever, be separated from any one of the first interlock terminal and the second interlock terminal; and a second switch configured to interlock with the first switch module and in contact with the first high voltage terminal and the second high voltage terminal, and configured to, upon an off operation of the switch lever, be separated from any one of the first interlock terminal and the second interlock terminal, and then separated from the first high voltage terminal and the second high voltage terminal.

The first switch module may include a first moving contact bar rotatably coupled to a first end portion of the first interlock terminal and configured to perform a seesaw operation with respect to the first end portion of the first interlock terminal as an axis according to on/off positions of the switch lever, and the second interlock terminal may be disposed at a position where a first end portion of the second interlock terminal is contactable with a first end portion of the first moving contact bar.

The first moving contact bar may include a push bar configured to rise or fall during the seesaw operation and connected to a second end portion of the first moving contact bar so as to depress the second switch upon falling, and the second switch may be configured to interlock with the first switch in response to being depressed by the push bar.

The push bar may include an insulating material.

The second switch may include a support disposed vertically; a second moving contact bar configured to pivot about a first end portion of the support, the second moving contact bar having a first end configured to contact the push bar; and a pair of high voltage connection pins extending downward from the second moving contact bar and configured to contact a second end of the second moving contact bar, and the first high voltage terminal and the second high voltage terminal may be disposed on lower portions of the pair of high voltage connection pins, and may be configured to removably contact the pair of high voltage connection pins according to a seesaw operation of the second moving contact bar.

Each of the pair of high voltage connection pins may be hinge-coupled to the second moving contact bar.

The second moving contact bar may include an insulating portion comprising an insulating material and a conductive portion comprising an electrically conductive material, and the insulating portion may extend to a position where the insulating portion is contactable with the push bar, and the conductive portion may be connected to the pair of high voltage connection pins.

The second switch may further include an elastic member configured to elastically support the insulating portion at a lower portion of the insulating portion.

The second switch may further include a pin guide tube member having a tubular body for guiding upward and downward linear movement of the pair of high voltage connecting pins between the conductive portion and the first high voltage terminal and the second high voltage terminal.

Each of the first high voltage terminal and the second high voltage terminal may include a respective socket portion into which the corresponding high voltage connection pin is insertable, and a respective fastening portion extending from the corresponding socket portion and exposed to an outside of the housing.

In another aspect of the present disclosure, there is provided a battery pack including the power disconnection device of any of the embodiments described herein.

Advantageous Effects

According to an aspect of the present disclosure, the power disconnection device capable of disconnecting power safely and conveniently by using the switch method may be provided.

That is, the power disconnection device according to the present disclosure is configured to sequentially disconnect the interlock terminal and the high voltage terminal by operating the switch lever on/off with the force of a finger, and thus the user may safely and easily disconnect the power of the battery pack.

The effects of the present disclosure will be more clearly understood by the following examples of the present disclosure. It will also be readily apparent that the present disclosure can be realized by the means and combinations thereof indicated in the claims of the present disclosure.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

A power disconnection device 100 to be described below is collectively referred to by various names such as manual service disconnect (MSD), safety plug, service plug, disconnect switch, etc. in the art, and, for example, as a component included in a battery pack 200 for an electric vehicle, generally refers to a device used by a user to manually disconnect the power of the high voltage battery pack 200 in an emergency.

Figure 1:
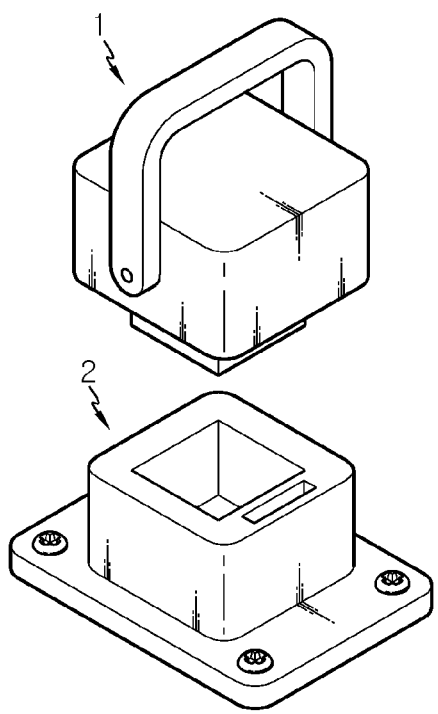
FIG. 1 is a diagram schematically illustrating a configuration of a power disconnection device according to the related art.
Figure 2:
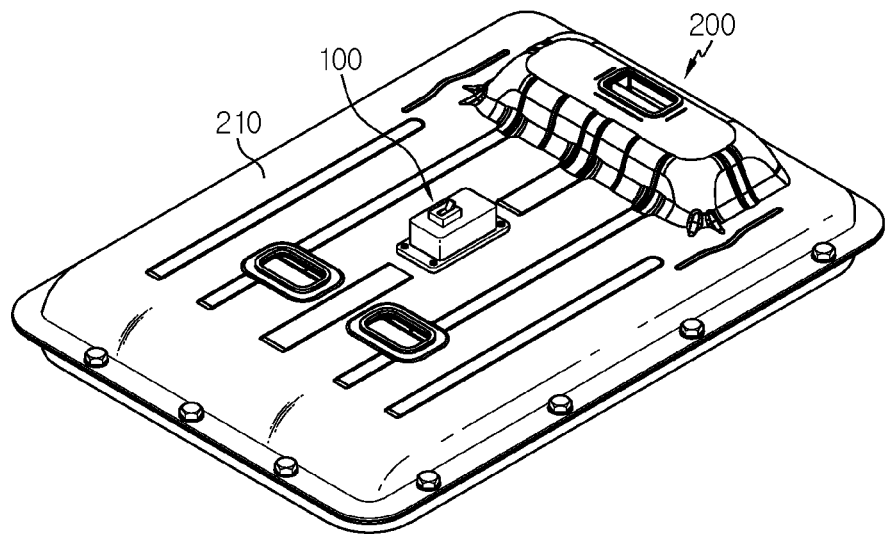
FIG. 2 is a diagram illustrating a battery pack on which a power disconnection device according to an embodiment of the present disclosure is mounted.
Figure 3:
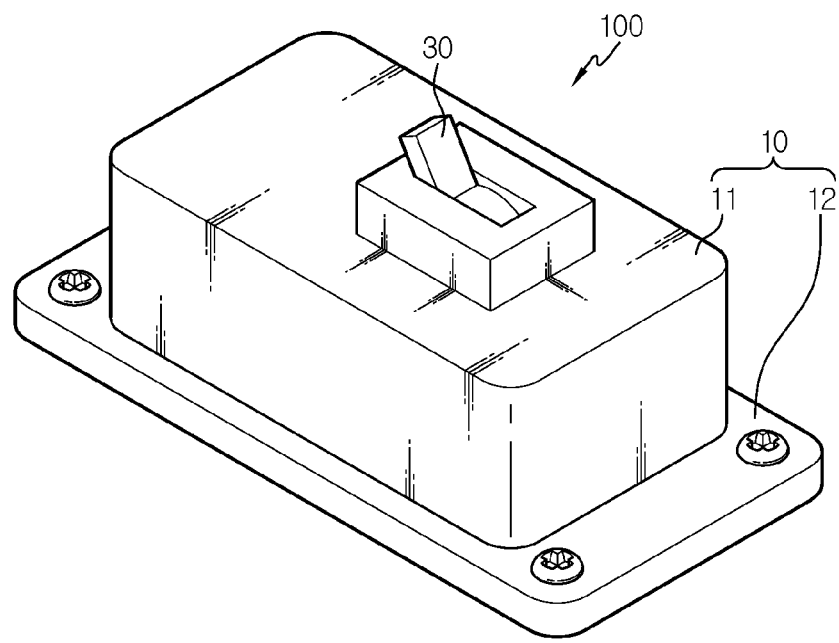
FIG. 3 is a perspective view of the power disconnection device according to an embodiment of the present disclosure.
Figure 4:
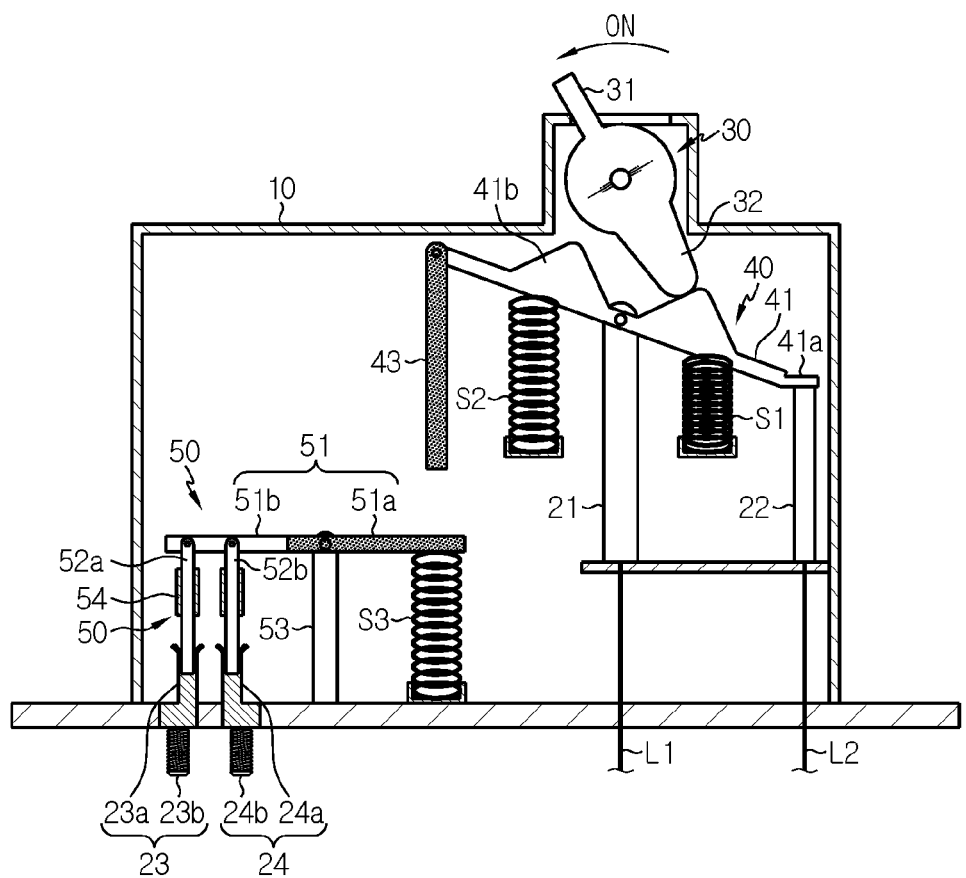
FIG. 4 is a diagram schematically illustrating an internal configuration in an on state of the power disconnection device according to an embodiment of the present disclosure.

FIG. 2 is a diagram illustrating a battery pack on which a power disconnection device according to an embodiment of the present disclosure is mounted, FIG. 3 is a perspective view of the power disconnection device according to an embodiment of the present disclosure, and FIG. 4 is a diagram schematically illustrating an internal configuration in an on state of the power disconnection device according to an embodiment of the present disclosure.

Referring to these figures, the power disconnection device 100 according to an embodiment of the present disclosure includes a housing 10 forming an exterior, a first interlock terminal 21, a second interlock terminal 22, a first high voltage terminal 23, a second high voltage terminal 24, a switch lever 30, a first switch module 40, and a second switch module 50 that are provided inside the housing 10.

In the case of an electric vehicle, because the battery pack 200 is usually mounted on a underside of the vehicle body, a cover is provided to hide the battery pack 200 under the vehicle seat. The power disconnection device 100 is installed on an upper portion of a pack case 210 of the battery pack 200 so that the power disconnection device 100 may be immediately visible when the cover is opened.

The housing 10 of the power disconnection device 100 may include a box-shaped body portion 11 for accommodating and protecting components, and a plate-shaped flange portion 12 provided on a lower portion of the body portion 11. The pack case 210 includes through holes in an upper surface. An electric wire, a flexible bus bar (or a high voltage cable), etc. are pulled out from the inside of the battery pack 200 through the through holes and connected to terminals of the power disconnection device 100. In addition, the power disconnection device 100 may be installed on the upper portion of the pack case 210 by covering the through holes with the flange portion 12 of the housing 10 and fastening the flange portion 12 with bolts.

As will be described below in detail, the power disconnection device 100 according to the present disclosure is configured to disconnect the power of the switch-type high-voltage battery pack 200, and thus the power disconnection device 100 is much superior in user convenience to the detachable type power disconnection device 100 of the related art.

For example, in the detachable type power disconnection device 100 of the related art, in order to disconnect the power of the battery pack 200, first, an interlock pin needs to be released by pulling a lever, and a plug needs to be removed from a socket. However, the power disconnection device 100 according to the present disclosure only needs to flip the switch lever 30 to an OFF position with the force of a finger.

Hereinafter, the main configuration and operation of the power disconnection device 100 will be described in detail.

The first interlock terminal 21 and the second interlock terminal 22 are terminals connected to an interlock circuit of the battery pack 200. Here, the interlock circuit refers to a circuit that notifies an abnormal situation that occurs when a device deviates from a normal state, and stops the device immediately to protect the user's safety. The interlock circuit of the battery pack 200 may be configured to include a control unit (e.g., a battery management system (BMS)) that detects a connection state between the first interlock terminal 21 and the second interlock terminal 22 and a power relay device controlled by the control unit. For example, when the connection between the first interlock terminal 21 and the second interlock terminal 22 is cut off, it is regarded as out of the normal state and the BMS turns off the power relay device to block the flow of large current of the battery pack 200. The configuration of such an interlock circuit is widely known in the art, and thus a detailed description thereof is omitted.

The first high voltage terminal 23 and the second high voltage terminal 24 are terminals connected to a high voltage line of the battery pack 200. For example, battery modules are usually connected in series inside the battery pack 200, wherein a cable between two of the battery modules is cut off, one end of the cable is connected to the first high voltage terminal 23, and the other end of the cable is connected to the second high voltage terminal 24. Accordingly, when the connection between the first high voltage terminal 23 and the second high voltage terminal 24 is cut off inside the power disconnection device 100, the power of the battery pack 200 is disconnected.

At this time, if the connection between the first high voltage terminal 23 and the second high voltage terminal 24 is cut off while a large current is flowing, a strong spark is generated, which may cause danger to the operator, and the power disconnection device 100 may be damaged by a fire. Therefore, when the power of the high voltage battery pack 200 is disconnected, before the connection between the first high voltage terminal 23 and the second high voltage terminal 24 is cut off for safety, the interlock circuit is cut off so that it is necessary to send a control signal from the BMS, turn off the power relay, and block the flow of large current in advance.

To this end, like the existing detachable type power disconnection device, even the switch-type power disconnection device 100 needs to be configured such that the connection between the first interlock terminal 21 and the second interlock terminal 22 is cut off, and then at a time difference, the connection between the first high voltage terminal 23 and the second high voltage terminal 24 is cut off.

As a means for implementing such an operation mechanism, the power disconnection device 100 according to the present disclosure includes a first switch module 40 operating by the switch lever 30 and a second switch module 50 interlocking with the first switch module 40.

The switch lever 30 includes a handle 31 exposed to the outside of the housing 10 and a rod portion 32 formed by extending from the handle 31 to a predetermined position inside the housing 10, and may be provided to be rotatable in front and reverse directions within a predetermined angle range with respect to a support point. For example, as shown in FIG. 4, the switch lever 30 may be provided such that the handle 31 of the switch lever 30 may be tilted to the left or right at a predetermined angle.

The first switch module 40 may be in contact with the first interlock terminal 21 and the second interlock terminal 22, upon an off operation of the switch lever 30, may operate by the switch lever 30 and provided to be separated from any one of the first interlock terminal 21 and the second interlock terminal 22.

Specifically, the first switch module 40 according to the present embodiment may be configured to include a first moving contact bar 41, springs S1 and S2, and a push bar 43, and the first interlock terminal 21 and the second interlock terminal 22 may be configured in the form of metal rods disposed on a lower portion of the first moving contact bar 41 and extending side by side in a vertical direction. Then, wires L1 and L2 are respectively connected to a lower end of the first interlock terminal 21 and a lower end of the second interlock terminal 22. The wires L1 and L2 may be used to connect the first interlock terminal 21 and the second interlock terminal 22 to the interlock circuit of the battery pack 200.

The first moving contact bar 41 is a bar-shaped conductor made of a metal material, and may be configured such that approximately a central portion is hinged to one end portion of the first interlock terminal 21 to be rotatable with respect to one end of the first interlock terminal 21 as an axis. In addition, the first moving contact bar 41 may further include a protrusion 41b having inclined surfaces on a left side and a right side to secure a smooth contact distance when the switch lever 30 rotates.

The spring includes the first spring S1 and the second spring S2. The first spring S1 and the second spring S2 may be disposed below the right side and the left side of the first moving contact bar 41 with respect to the first interlock terminal 21. The two springs limit a rotation radius of the first moving contact bar 41 and provide force against a pressurization force of the switch lever 30. For this reason, a predetermined force needs to be applied to tilt the switch lever 30.

For example, it may be preferable to place a cover on the switch lever 30 in order to prevent unintentional movement of the switch lever 30 due to an external impact or an operator's mistake, or set the force required to tilt the switch lever 30 to 10 kgf to 15 kgf by using a spring having a relatively great elastic modulus. That is, it is preferable to prevent the switch lever 30 from moving with a force less than or equal to at least 10 kgf.

As for the switch lever 30, when the handle 31 is tilted to an on position, the rod portion 32 pressurizes the right side of the first moving contact bar 41, and when the handle 31 is tilted to an off position, the rod portion 32 pressurizes the left side of the first moving contact bar 41. Accordingly, according to the on/off positions of the switch lever 30, the first moving contact bar 41 performs a seesaw operation with respect to one end portion of the first interlock terminal 21 as the axis.

The second interlock terminal 22 is disposed at a position where one end portion is contactable with one end portion 41a of the first moving contact bar 41 when the switch lever 30 is in the on position as shown in FIG. 4. When the second interlock terminal 22 is in contact with the first moving contact bar 41 that is a conductor, the second interlock terminal 22 may conduct electricity with the first interlock terminal 21.

When the handle 31 of the switch lever 30 in the on position is tilted to the right, the first moving contact bar 41 performs the seesaw operation and the one end portion 41a of the first moving contact bar 41 rises and is separated from the second interlock terminal 22. In this case, an electrical connection between the first interlock terminal 21 and the second interlock terminal 22 is cut off, and accordingly, the interlock circuit is in an unconnected state.

The push bar 43 is a rod-shaped member formed by extending in a lower direction from the other end portion of the first moving contact bar 41 and may be hinged to the other end portion of the first moving contact bar 41. Such a push bar 43 is configured to rise or fall during the seesaw operation of the first moving contact bar 41, and pressurize the second switch module 50 upon falling. Even when the push bar 43 is in contact with the second switch module 50, the push bar 43 may be made of an insulating material so that current does not flow between the first switch module 40 and the second switch module 50.

The second switch module 50 may interlock with the first switch module 40 by receiving pressure when the push bar 43 falls, may be in contact with the first high voltage terminal 23 and the second high voltage terminal 24 and separated from any one of the first interlock terminal 21 and the second interlock terminal 22, and then may be configured to be separated from the first interlock terminal 21 and the second interlock terminal 22.

Specifically, the second switch module 50 according to the present embodiment includes a support 53, a second moving contact bar 51, a pair of high voltage connection pins 52a and 52b, a third spring S3, and a pin guide tube member 54.

The support 53 is a bar-shaped member vertically disposed inside the housing 10, supports the second moving contact bar 51, and has one end portion serving as a rotation axis of the second moving contact bar 51.

The second moving contact bar 51 is disposed in a direction crossing the support 53, and has approximately a central portion hinged to one end portion of the support 53. Accordingly, similarly to the first moving contact bar 41, the second moving contact bar 51 may also rotate with respect to one end portion of the support 53 as an axis.

In addition, the second moving contact bar 51 may be formed of two types of materials. That is, the second moving contact bar 51 includes an insulating portion 51a formed of an insulating material and a conductive portion 51b formed of an electrically conductive material. As shown in FIG. 4, a right side of the second moving contact bar 51 may be formed as the insulating portion 51a and a left side of the second moving contact bar 51 may be formed as the conductive portion 51b. The insulating portion 51a may extend to a position where the insulating portion 51a is contactable with the push bar 43, and a lower portion thereof may be supported by a third spring S3. Here, the third spring S3 may be replaced with another type of elastic member having an elastic restoring force. The conductive portion 51b may extend in a direction opposite to the insulating portion 51a by a length of the insulating portion 51a for balance.

The pair of high voltage connection pins 52a and 52b may be hinged to the conductive portion 51b and may be provided to extend in a downward direction crossing the conductive portion 51b.

The pin guide tube member 54 is a member in the form of a tubular body through which the high voltage connection pins 52a and 52b pass, and serves to guide upward and downward linear movement of the pair of high voltage connection pins 52a and 52b between conductive portion 51b and the first high voltage terminal 23 and the second high voltage terminal 24.

The first high voltage terminal 23 and the second high voltage terminal 24 of the present embodiment respectively include socket portions 23a and 24a formed so that the respectively corresponding high voltage connection pins 52a and 52b may be inserted, and fastening portions 23b and 24b extending from the socket portions 23a and 24a and exposed to the outside of the housing 10. For example, the fastening portion 23b of the first high voltage terminal 23 and a negative electrode terminal (not shown) of a battery module are connected to each other by a flexible bus bar, and the fastening portion 24b of the second high voltage terminal 24 and a positive electrode terminal (not shown) of another battery module may be connected to each other by another flexible bus bar.

The above-described second switch module 50 may be configured such that the second moving contact bar 51 is horizontally supported by the third spring S3, and the pair of high voltage connection pins 52a and 52b are in contact with the first high voltage terminal 23 and the second high voltage terminal 24, respectively, when the switch lever 30 is in the on state. Also, when the switch lever 30 is in the off state, as the third spring S3 is compressed by pressing of the push bar 43, the insulating portion 51a falls and the conductive portion 51b rises. At this time, the pair of high voltage connection pins 52a and 52b may be in non-contact with the first high voltage terminal 23 and the second high voltage terminal 24.

Next, an example of use of the power disconnection device 100 having the configuration described above will be described with reference to FIGS. 4 to 9.

The power disconnection device 100 of the battery pack 200 is normally in an on state. At this time, referring to FIGS. 4 and 5, the switch lever 30 pressurizes the right side of the first moving contact bar 41 so that the one end portion 41a of the first moving contact bar 41 moves down the rotation axis and comes into contact with the second interlock terminal 22, and the other end portion of the first moving contact bar 41 rises above the rotation axis, and thus, the push bar 43 and the second switch module 50 are in a non-contact state. Accordingly, the first interlock terminal 21 and the second interlock terminal 22 are in a state capable of conducting electricity with each other by means of the first moving contact bar 41, and the first high voltage terminal 23 and the second high voltage terminal 24 are in the state capable of conducting electricity with each other by means of the second moving contact bar 51.

Figure 5:
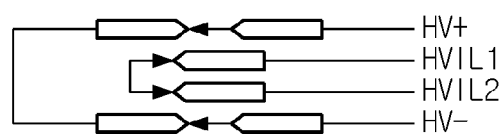
FIG. 5 is a diagram corresponding to FIG. 4, and schematically illustrates a connection state between terminals when the power disconnection device is in an on state.

That is, when the switch lever 30 is in the on position, both the interlock circuit and the high voltage line are connected, and thus the power of the battery pack 200 is supplied to the load of the electric vehicle (In FIG. 5, HVIL 1 corresponds to the first interlock terminal 21, HVIL 2 corresponds to the second interlock terminal 22, HV+ corresponds to the first high voltage terminal 23, and HV− corresponds to the second high voltage terminal 24).

Figure 6:
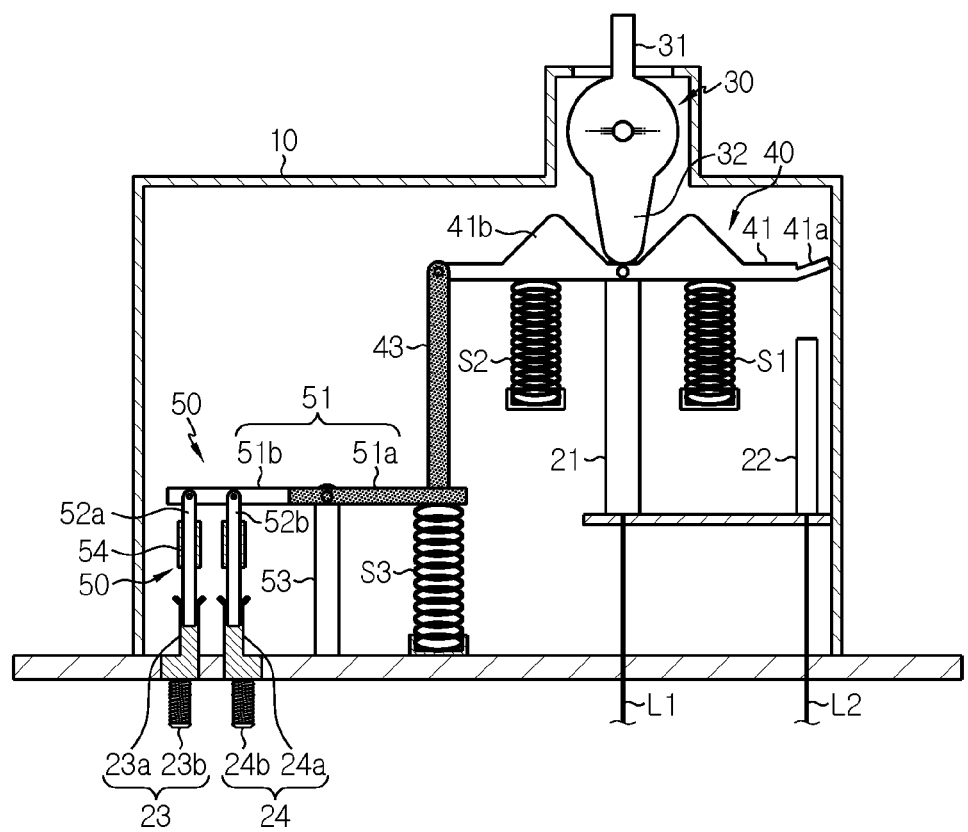
FIG. 6 is a diagram schematically illustrating an internal configuration in a transient state of the power disconnection device according to an embodiment of the present disclosure that transits from on to off.
Figure 8:
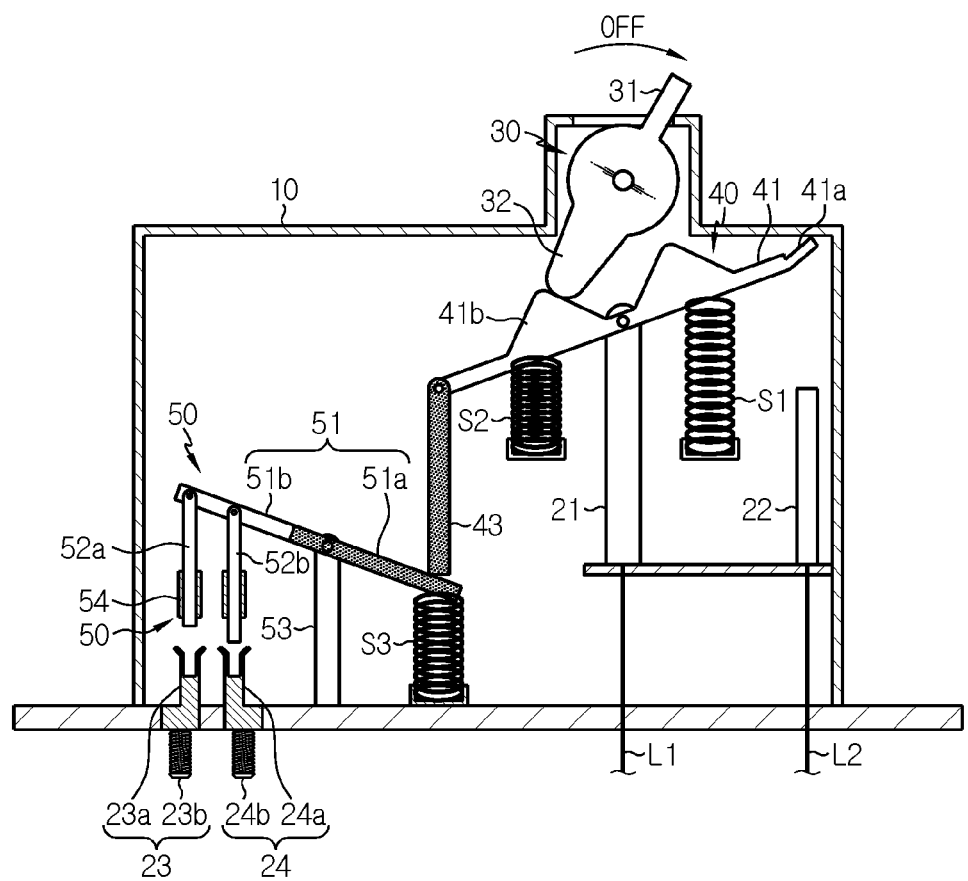
FIG. 8 is a diagram schematically illustrating an internal configuration in an off state of the power disconnection device according to an embodiment of the present disclosure.

When the power of the battery pack 200 is disconnected, the switch lever 30 is tilted to the off position. At this time, the switch lever 30 is tilted in two steps. For example, as shown in FIG. 6, the switch lever 30 is tilted and erected vertically and then at predetermined time interval, as shown in FIG. 8, the switch lever 30 is fully tilted to the off position. Here, a step of tilting and erecting the switch lever 30 vertically is a first step, and a step of fully tilting the switch lever 30 to the off position is a second step.

Figure 7:
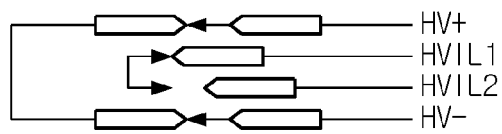
FIG. 7 is a diagram corresponding to FIG. 6, and schematically illustrates a connection state between terminals when the power disconnection device transits from on to off.

Referring to FIGS. 6 and 7, in the first step, the switch lever 30 pressurizes a rotation axis portion of the first moving contact bar 41. Therefore, the one end portion 41a of the first moving contact bar 41 rises to the height of the rotation axis and is separated from the second interlock terminal 22, and the other end portion of the first moving contact bar 41 falls to the height of the rotation axis. At this time, the push bar 43 may fall to a position close to or simply in contact with an upper surface of the second moving contact bar 51.

Accordingly, the first interlock terminal 21 and the second interlock terminal 22 are in a state incapable of conducting electricity with each other, and a power supply disconnection signal is transmitted to the BMS. Even when the power relay is turned off according to the control signal of the BMS and the first high voltage terminal 23 and the second high voltage terminal 24 are connected, the flow of large current is cut off.

Figure 9:
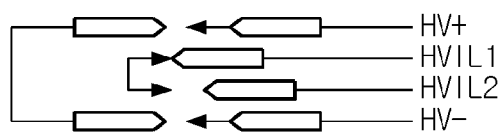
FIG. 9 is a diagram corresponding to FIG. 8, and schematically illustrating a connection state between terminals when the power disconnection device is in an off state.

Referring to FIGS. 8 and 9, in the second step, the switch lever 30 pressurizes the left side of the first moving contact bar 41. Therefore, one end portion of the first moving contact bar 41 further rises above the rotation axis, and the other end portion of the first moving contact bar 41 further falls below the rotation axis. At this time, the insulating portion 51a of the second moving contact bar 51 is pressed by the push bar 43 and falls below the rotation axis, and the conductive portion 51b of the second moving contact bar 51 of the opposite side rises above rotation axis so that the pair of high voltage connection pins 52a and 52b are separated from the first high voltage terminal 23 and the second high voltage terminal 24.

Therefore, when the switch lever 30 is tilted to the off position, even the first high voltage terminal 23 and the second high voltage terminal 24 are in the state incapable of conducting electricity with each other, and thus the power of the battery pack 200 may be physically disconnected.

As described above, when the power disconnection device 100 according to the present disclosure is used, the operator may disconnect the power of the battery pack 200 more conveniently and safely than the detachable type power disconnection device 100 of the related art and perform a necessary operation.

Meanwhile, a battery pack according to the present disclosure may be configured to include the power disconnection device described above, a plurality of battery modules connected in series with the power disconnection device, a cooling system for managing the temperature of the battery modules, various devices (not shown) for controlling charging and discharging of the battery modules, such as BMS, current sensor, fuse, and a pack case for storing and installing the components.

The battery pack may be applied to a vehicle such as an electric vehicle or a hybrid vehicle. That is, in the present disclosure, the battery pack may be used as a driving energy source of an electric vehicle.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, although the terms indicating directions such as up, down, left, right, front, and back are used herein, these terms are only for convenience of description, and it is obvious to one of ordinary skill in the art that the terms may vary depending on the location of a target object or the location of an observer.

What is claimed is:

1. A power disconnection device for manually disconnecting power of a battery pack, the power disconnection device comprising:
   a housing;
   a first interlock terminal and a second interlock terminal provided in the housing and connectable to an interlock circuit of the battery pack;
   a first high voltage terminal and a second high voltage terminal connectable to a high voltage line of the battery pack;
   a switch lever disposed over inner and outer portions of the housing;
   a first switch configured to, upon an on operation of the switch lever, be in contact with the first interlock terminal and the second interlock terminal, and upon an off operation of the switch lever, be separated from any one of the first interlock terminal and the second interlock terminal; and
   a second switch interlocked with the first switch and configured to, upon the on operation of the switch lever, be in contact with the first high voltage terminal and the second high voltage terminal, and upon the off operation of the switch lever, be separated from the first high voltage terminal and the second high voltage terminal,
   wherein the first and second switches are configured such that separation of the first switch from any one of the first interlock terminal and the second interlock terminal occurs prior to separation of the second switch from the first high voltage terminal and the second high voltage terminal.

2. The power disconnection device of claim 1,
   wherein the first switch comprises a first moving contact bar rotatably coupled to a first end portion of the first interlock terminal and configured to perform a seesaw operation with respect to the first end portion of the first interlock terminal as an axis according to on/off positions of the switch lever, and wherein the second interlock terminal is disposed at a position where a first end portion of the second interlock terminal is contactable with a first end portion of the first moving contact bar.

3. The power disconnection device of claim 2, wherein the first moving contact bar comprises a push bar configured to rise or fall during the seesaw operation and connected to a second end portion of the first moving contact bar so as to depress the second switch upon falling, and wherein the second switch is configured to interlock with the first switch in response to being depressed by the push bar.

4. The power disconnection device of claim 3, wherein the push bar comprises an insulating material.

5. The power disconnection device of claim 3, wherein the second switch comprises:

a support disposed vertically;

a second moving contact bar configured to pivot about a first end portion of the support, the second moving contact bar having a first end configured to contact the push bar; and a pair of high voltage connection pins extending downward from the second moving contact bar and configured to contact a second end of the second moving contact bar, and wherein the first high voltage terminal and the second high voltage terminal are disposed on lower portions of the pair of high voltage connection pins, and are configured to removably contact the pair of high voltage connection pins according to a seesaw operation of the second moving contact bar.

6. The power disconnection device of claim 5, wherein each of the pair of high voltage connection pins is hinge-coupled to the second moving contact bar.

7. The power disconnection device of claim 5, wherein the second moving contact bar comprises an insulating portion comprising an insulating material and a conductive portion comprising an electrically conductive material, and wherein the insulating portion extends to a position where the insulating portion is contactable with the push bar, and the conductive portion is connected to the pair of high voltage connection pins.

8. The power disconnection device of claim 7, wherein the second switch further comprises an elastic member configured to elastically support the insulating portion at a lower portion of the insulating portion.

9. The power disconnection device of claim 7, wherein the second switch further comprises a pin guide tube member having a tubular body for guiding upward and downward linear movement of the pair of high voltage connecting pins between the conductive portion and the first high voltage terminal and the second high voltage terminal.

10. The power disconnection device of claim 9, wherein each of the first high voltage terminal and the second high voltage terminal comprises a respective socket portion into which the corresponding high voltage connection pin is insertable, and a respective fastening portion extending from the corresponding socket portion and exposed to an outside of the housing.

11. An apparatus comprising:
the power disconnection device according to claim 1; and
the battery pack.

12. A power disconnection device for manually disconnecting power of a battery pack, the power disconnection device comprising:

a housing;

a first interlock terminal and a second interlock terminal provided in the housing and connectable to an interlock circuit of the battery pack;

a first high voltage terminal and a second high voltage terminal connectable to a high voltage line of the battery pack;

a switch lever disposed over inner and outer portions of the housing;

a first switch in contact with the first interlock terminal and the second interlock terminal, and configured to, upon an off operation of the switch lever, be separated from any one of the first interlock terminal and the second interlock terminal; and a second switch interlocked with the first switch by a contact bar and in contact with the first high voltage terminal and the second high voltage terminal, and configured to, upon an off operation of the switch lever, be separated from any one of the first interlock terminal and the second interlock terminal, and then separated from the first high voltage terminal and the second high voltage terminal by a motion of the contact bar.

13. The power disconnection device of claim 12, wherein the contact bar is rotatably coupled to a first end portion of the first interlock terminal and configured to perform a seesaw operation with respect to the first end portion of the first interlock terminal as an axis according to on/off positions of the switch lever, and wherein the second interlock terminal is disposed at a position where a first end portion of the second interlock terminal is contactable with a first end portion of the contact bar.

14. The power disconnection device of claim 13, wherein the contact bar comprises a push bar configured to rise or fall during the seesaw operation and connected to a second end portion of the first moving contact bar so as to depress the second switch upon falling, and wherein the second switch is configured to interlock with the first switch in response to being depressed by the push bar.

15. The power disconnection device of claim 14, wherein the push bar comprises an insulating material.

16. The power disconnection device of claim 14, wherein the second switch comprises:

a support disposed vertically;

a second contact bar configured to pivot about a first end portion of the support, the second contact bar having a first end configured to contact the push bar; and a pair of high voltage connection pins extending downward from the second contact bar and configured to contact a second end of the second contact bar, and wherein the first high voltage terminal and the second high voltage terminal are disposed on lower portions of the pair of high voltage connection pins, and are configured to removably contact the pair of high voltage connection pins according to a seesaw operation of the second contact bar.

17. The power disconnection device of claim 16, wherein each of the pair of high voltage connection pins is hinge-coupled to the second contact bar.

18. The power disconnection device of claim 16,
wherein the second contact bar comprises an insulating portion comprising an insulating material and a conductive portion comprising an electrically conductive material, and
wherein the insulating portion extends to a position where the insulating portion is contactable with the push bar, and the conductive portion is connected to the pair of high voltage connection pins.

19. The power disconnection device of claim 18,
wherein the second switch further comprises an elastic member configured to elastically support the insulating portion at a lower portion of the insulating portion.

20. The power disconnection device of claim 18, wherein the second switch further comprises a pin guide tube member having a tubular body for guiding upward and downward linear movement of the pair of high voltage connecting pins between the conductive portion and the first high voltage terminal and the second high voltage terminal.

21. The power disconnection device of claim 20, wherein each of the first high voltage terminal and the second high voltage terminal comprises a respective socket portion into which the corresponding high voltage connection pin is insertable, and a respective fastening portion extending from the corresponding socket portion and exposed to an outside of the housing.

22. An apparatus comprising:
the power disconnection device according to claim 12; and
the battery pack.

* * * * *